United States Patent [19]

Hopkins et al.

[11] 4,452,910

[45] Jun. 5, 1984

[54] CHROMIUM EXPANDED SMECTITE CLAY

[75] Inventors: P. Donald Hopkins, St. Charles; Bernard L. Meyers, Wheaton; Donna M. Van Duch, Naperville, all of Ill.

[73] Assignee: Standard Oil Company (Indiana), Chicago, Ill.

[21] Appl. No.: 388,697

[22] Filed: Jun. 15, 1982

[51] Int. Cl.$^3$ .............................................. B01J 21/16
[52] U.S. Cl. ........................................ 502/84; 502/85
[58] Field of Search ................ 252/455 R; 502/84, 85

[56] References Cited

U.S. PATENT DOCUMENTS 4,060,480 11/1977 Reed et al. ...................... 208/251 H
4,216,188 8/1980 Shabria et al. .................. 252/455 R

OTHER PUBLICATIONS

American Minerologist, vol. 64, pp. 830–835, (1979), by G. W. Brindley et al.

Primary Examiner—Delbert E. Gantz
Assistant Examiner—Anthony McFarlane
Attorney, Agent, or Firm—Robert E. Sloat; William T. McClain; William H. Magidson

[57] ABSTRACT

Expanded layer, smectite clay having a regular pore structure suitable for catalytic uses and a process for preparing said expanded clay by treating a suspension of commercial smectite clay with a chromium-oligomer solution and subjecting the treated clay to a stabilization heat treatment in an inert gas atmosphere.

13 Claims, No Drawings

CHROMIUM EXPANDED SMECTITE CLAY

BACKGROUND OF THE INVENTION

This invention relates to the preparation of expanded layer, smectite clays which provide a regular pore structure for use as a shape selective catalyst, catalyst support, or adsorbent material. More particularly, this invention relates to chromium expanded bentonite clays with the expanded layer pore structure stabilized by thermal treatment in an inert gas atmosphere.

While molecular sieve catalytic materials have been useful in upgrading petroleum stocks, there is a need for new catalytic sieves. The smectite-type clays are capable of layer expansion to form pores with a different shape than the zeolites.

The chemical formulae of all smectite clays are similar to either pyrophyllite or talc clay but substitutions are made for ions in octahedral or tetrahedral sites by ions of lower valency along with addition of an equivalent number of interlayer cations for charge balance (see Deer, Howie, and Zussman, *An Introduction to the Rock-Forming Minerals*, p. 265 Langman Group Ltd., London (1966)). The smectite clay general formula is then,

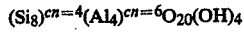

$$(Si_8)^{cn=4}(Al_4)^{cn=6}O_{20}(OH)_4$$

where cn=4 means a coordination number of four and cn=6, a coordination number of six. The substitute four-fold coordination ion typically includes $Al^{3+}$ and $Fe^{3+}$, and possibly $B^{3+}$, or $Be^{2+}$. The substitute six-fold coordinated ion usually includes $Mg^{2+}$ and possibly $Fe^{2+}$, $Ni^{2+}$, $Co^{2+}$, $Li^+$, and numerous others known to one of ordinary skill in the art. If the clay is talc, the six-fold coordinated ion is $Mg^{2+}$, and the substitutes must be univalent ions such as $Li^+$. If water is also present between the smectite clay layers, it is weakly bonded to the layers or is present as a hydrate of the interlayer metal cations. Typical smectite clays include bentonite, montmorillonite, beidellite, chlorite, vermiculite, hectorite, and saponite. The bentonite clays used here are primarily montmorillonite clays with silica and other clays as minor contaminates.

We believe it is particularly desirable to prepare expanded smectite clays using chromium-based interlayer complexes since oxides of chromium in catalysts have demonstrated enhanced and/or different catalytic activities. See, for example, *Advances in Catalysis*, Vol. 30, pp. 1-3, Academic Press, N.Y. (1969); and Vol. 17, p. 225. Expanded layer, smectite clays have been disclosed which are based on various cationic species, including Al, Ti, Fe, Co, Ni, and Zr. For example, see U.S. Pat. Nos. 4,060,480; 4,176,090; and 4,216,188; and also see *American Mineralogist* 64, 830 (1979), and *Clays and Clay Minerals* 27, 201 (1979). However, problems have occurred in the attempts to produce expanded clays using chromium complexes. These problems include the inability to produce: (1) an expanded clay which has stable expanded layers in air above 200° C., and (2) an expanded clay with nearly all the available clay layers in the expanded state.

The use of inorganic exchange ions to expand smectite layers is disclosed in U.S. Pat. No. 4,060,480 (Reed and Jaffe). In this patent, the clay is treated with hydroxy-aluminum polymers or oligomers in solution, and the clay is dried and calcined to produce supporting "pillars" between clay layers. These "pillars" maintain the expanded layer state in the clay and leave porosity framed by the "pillars" and the expanded layers. In smectite clays these resulting pores have a rectangular-type opening due to this framing by the "pillars" and clay layers. Thus, the pores have a different shape than the zeolites, which are more circular in shape. In any event, this work by Reed and Jaffe does not suggest either the formation of chromium-based "pillars" between clay layers or the stabilization of the "pillars" by heat treatment in an inert gas atmosphere. A related work on use of aluminum-based polymers to expand the clay layers is Vaughn and Lussier, *Preparation of Molecular Sieves Based on Pillared Interlayered Clays (PILC)*, Fifth International Conference on Zeolites, Naples, Italy, page 94 (1980). In this publication the expanded clays are prepared using aluminum-based oligomers, and the expanded layers are alleged to exhibit thermal stability to about 650° C. While this reference suggests calcination at 500° C. in air produces a stable expanded clay, such a heat treatment results in the collapse of chromium-based clay "pillars" (see Example 4).

Metallic interlayer oligomers of zirconium and titanium have also been utilized to prepare expanded smectite clay materials, and are disclosed in U.S. Pat. No. 4,176,090 (Vaughn et al.). This patent does not, however, disclose chromium oligomers as a possible cation interlayer species, nor is there any suggestion of stabilizing the expanded smectite clay layers by a heat treatment in an inert gas atmosphere.

Organic amine complexes of Fe, Co, and Ni have been used by Loeppert, Mortland, and Pinnavaia to prepare expanded clays as disclosed in *Clays and Clay Minerals* 27, 201 (1979). Smectite and vermiculite clays are reacted with organic amine complexes of Fe, Co, and Ni to produce expanded clays with (001) planer spacings alleged to range to 18 angstroms for smectite clays and 27 angstroms for vermiculite clays. However, this publication does not disclose chromium expanded clays, and expanded clays prepared with these organic complexes are unstable because calcination would destroy the organic complex, resulting in collapse of the expanded clay layers.

U.S. Pat. No. 4,216,188 (Shabtai) discloses the use of one variety of chromium oligomer to form expanded montmorillonite clay. This patent discloses a chromium oligomer prepared from a mixture of $CrK(SO_4)_2$ and NaOH. Although Shabtai discloses one variety of chromium-based interlayer oligomer for the expanded clays, the starting materials and conditions for the preparation of the oligomer solution and the conditions for reaction of the oligomer with the clay differ from the instant invention.

The Shabtai patent also sets forth apparently equally effective heat treatments to stabilize expanded clay layers: (a) air at 150°-450° C. or (b) inert gas, for example, nitrogen, from 150° C.-450° C. However, the present inventors have established a class of chromium-based expanded clays which require treatment with inert gas only. Unless preceded by the inert gas heat treatment at temperatures of approximately 500° C., air or oxygen heat treatments above 200° C. have a tendency to cause collapse of the expanded layers (see Examples 4, 5, and 10).

Additional work on hydroxy-chromium montmorillonite clays has been done by Brindley and Yamanaka, *A Study of Hydroxy-Chromium Montmorillonites and the Form of the Hydroxy-Chromium Polymers*, American Mineralogist 64, 830 (1979). Brindley et al. disclose preparation of a hydroxy-chromium oligomer prepared by reacting chromium nitrate with sodium hydroxide. Brindley et al., however, do not disclose any stabilization heat treatment for the chromium expanded clays, and experimental evidence shows differences exist between the process and composition of clay prepared by Brindley versus the instant invention (see Example 5).

It is the general object of the invention to provide a stable porous smectite clay with clay layers expanded by chromium oligomers and a process for preparing these materials. A more specific object of this invention is to provide a bentonite clay expanded by a chromium oligomer and stabilized by an inert gas heat treatment and a process for making these materials. Other objects of the invention will be apparent to persons skilled in the art from the following description and appended claims.

DESCRIPTION OF THE INVENTION

We have now found that the objects of the invention can be obtained by preparation of a porous, expanded smectite clay by a process comprising the contacting of an aqueous smectite clay slurry with an aged solution of chromium oligomer, separating a product clay from the mixture of clay and oligomer, drying the clay, and stabilizing the clay with an inert gas atmosphere heat treatment. A preferred version of the invention includes preparation of a porous, expanded bentonite clay by a process comprising deposition of chromium oligomer complexes between the molecular layers followed by a stabilization heat treatment in an inert atmosphere, preferably nitrogen gas.

The interlayer cations and/or water present in smectite clay starting materials are exchanged with cationic complexes, or oligomers, by contacting the clay with solutions containing the oligomers. These metallic oligomers deposit between clay layers and result in the expansion of the smectite layers. Smectite clays capable of undergoing such expansion comprise bentonite, montmorillonite, beidellite, chlorite, vermiculite, hectorite, and saponite.

In the instant invention a chromium oligomer solution is prepared by combining a chromium salt with a hydroxyl ion source in solution. This solution is aged to allow formation of a sufficient concentration of cationic oligomers, and the oligomer solution is then reacted with an aqueous smectite clay suspension to expand the clay layers. After layer expansion the product clay is separated from the clay-oligomer solution mixture, the clay is dried and subjected to heat treatments to stabilize the expanded clay layers.

In preparing chromium oligomer solutions, chromium salts capable of being used comprise the hydrated forms of chromium nitrate, chromium sulfate, and chromium chloride. The ratio of chromium salt to water is obtained by determination of the concentration of chromium oligomer necessary to produce a measurable amount of clay layer expansion. Thus, the lower limit on the quantity of chromium salt must be ascertained from the result of the "aging" step described in the next paragraph. The upper limit is the solubility of the salt in water. The preferred salt is chromium nitrate with a range of 6 to 72 grams per liter of oligomer solution. Furthermore, suitable sources for the hydroxyl ion component of the oligomer include ammonia, lithium hydroxide, sodium hydroxide, and potassium hydroxide. The preferred combination is chromium nitrate and ammonia in the instant invention. When using ammonia as the hydroxyl ion source, the upper limit on pH is set by the largest pH attainable using concentrated ammonia. However when using LiOH, NaOH, or KOH as the hydroxyl ion source, the total amount of added hydroxide must be kept below 2 moles per mole of Cr ion in order to avoid precipitation of chromium oxide. This practice must be followed if one uses the Brindley et al. or Shabtai method.

The chromium oligomer preparation requires an aqueous mixture of at least one of the chromium salts and one of the hydroxyl ion sources listed above. This mixture also must undergo an "aging" treatment, and "aging" is defined as the reaction time necessary to form a concentration of chromium oligomer which is sufficient to effectuate expansion of a measurable fraction of the smectite clay. By way of illustration, in Example 9 an oligomer aging time of 5 minutes resulted in a clay product with about 84 percent of the clay in the expanded state. In Example 15 an aging time of 2 minutes initially gave so large an amorphous structural portion that the expanded clay was not discernible until heat treatment. These examples establish a lower limit of oligomer contact time of about 2–5 minutes. In the instant invention the preferred aging time was about 24 hours.

A suspension of the smectite clay is prepared by dispersing the commercial, as received clay, in distilled water. The range of the clay/oligomer solution ratio is preferably 3 grams to 10 grams per liter in the final reaction oligomer solution. A maximum ratio is set by the capacity of the oligomer solution to react effectively with the suspension to cause expansion of the clay layers.

The step of contacting the clay suspension with the oligomer solution is preferably carried out at room temperature, but contacting temperatures can be as high as the boiling point of the solution mixture. The ratio of chromium to clay is 2 to 27 millimoles/gram of clay with a preferred ratio of 5 millimoles/gram of clay.

After clay expansion, the product clay is dried by heating the clay from 100°–200° C. in air or vacuum from 2–12 hours, preferably at 200° C. in air for 2 hours. Also, in some cases the product clay is subjected to an inert gas atmosphere heat treatment to stabilize the expanded layer state of the clay. The term "stabilize" means the ability of an expanded clay to maintain a majority of the clay material in an expanded layer state when held in an air atmosphere at a temperature of at least 300° C. for 2 hours. The inert gas atmosphere requirement is met by such gases as nitrogen, carbon dioxide, argon, krypton, xenon, neon, helium, and mixtures thereof. The preferred gas is nitrogen. The conditions for the stabilization heat treatment range from a minimum temperature of 200° C. with a preferred temperature of 500° C. for a time of 1 hour.

In a preferred form of the present invention, a $Cr(NO_3)_3 \cdot 9H_2O$ distilled water solution was combined with concentrated ammonia to form the chromium-oligomer solutions used for expansion of the bentonite clay layers. The chromium-oligomer solution was then contacted with a dispersion of bentonite clay in water to carry out the deposition of chromium oligomers between the bentonite clay layers, causing expansion of the layers.

After contacting the clay with the chromium-oligomer solution, the product clay was separated from the solution, dried for 2 hours at 200° C. and heated preferably at 500° C. in a nitrogen gas atmosphere for 1 hour. This treatment produced an expanded clay with chromium-based "pillars" between the (001) planes of the clay, and the expanded state was stable to at least 300° C. in air, overcoming the instability normally present above 200° C. Some degree of stabillity was also retained up to 500° C. in air.

Treatment solely in an oxidizing atmosphere at 200°-500° C. did not stabilize the expanded clay structure, and in fact calcination in air or oxygen at temperatures above 200° C. had a tendency to cause collapse of the expanded clay to the unexpanded structure. Differential thermal analysis of product clays prepared with concentrated ammonia determined that the clay stabilization treatment in a nitrogen gas atmosphere at 500° C. drastically reduced the exothermic phase transformation ordinarily present between 250° C. and 350° C. Without the stabilization step this exothermic phase change was accompanied by the collapse of the expanded clay structure: X-ray diffraction detected the return to (001) planar spacings characteristic of unexpanded clays. While not wishing to be bound by any particular theory, it appears the chromium in the "pillars" is present in the form of oxides of chromium.

The following examples are intended to illustrate the present invention without limiting the scope thereof.

GENERAL EXPERIMENTAL PROCEDURE

The starting clay materials capable of use in the instant invention include: bentonite, montmorillonite, beidellite, chlorite, vermiculite, hectorite, and saponite. Any one of these clays exhibit the ability to permit ion exchange and deposition of chromium oligomers between the clay molecular layers. The clay used in all the examples was a bentonite clay, either Volclay KWK or Volclay 325, provided by American Colloid Company. The clay was composed primarily of montmorillonite (greater than 90 percent) with some small fraction of silica and other clays. The preferred montmorillonite is the type of clay with high Na concentration rather than Ca because layer expansion is better in the former. The presence of high Ca concentration results in stronger interlayer bonding, making clay layer expansion and ion exchange more difficult. The bentonite clay was used as received to prepare the product expanded clay. The surface area of Volclay 325 was 23 $m^2$/gram measured by the Standard Oil Company method and 37 $m^2$/gram measured by commercial Accusorb instrumentation described below.

Once the product expanded clay was prepared as set forth in Examples 1-16, the surface area, micropore volume, and (001) basal plane spacings were determined and on some samples the Constraint Index was determined.

The measurement of surface area was accomplished using commercial instrumentation and/or the Standard Oil Company method. The Standard Oil Company method of determining surface area is based on clay adsorption of nitrogen gas from a flowing 10 percent $N_2$ gas-90 percent He gas mixture with the expanded clay maintained at liquid nitrogen temperature. The fundamental principles of this method are given by Nelsen and Eggerton in Anal. Chem. 30, 1387 (1958), and is incorporated by reference. Measurements were accomplished by placing approximately 0.2 grams of expanded clay material in the bottom of a glass U-tube 1.5 cm. in diameter, 15.7 cm. high, and 3.8 cm. wide. The gas composition which was passed over the clay and through the U-tube was nominally 10 percent $N_2$ -90 percent He. In order to be able to utilize the BET theory to analyze data output, the gas mixture must range from a nitrogen partial pressure of approximately 5 percent to 30 percent. The application of the BET theory using single or multiple partial pressure values is described by J. M. Thomas and W. J. Thomas in *Introduction to the Principles of Heterogeneous Catalysis*, pp. 82-84, Academic Press, N.Y. (1967). This is incorporated by reference into this specification.

The clay in the U-tube was first heated to 300° C. to remove water and other volatiles. The time required to do this step was about 1 hour, but the step can be shortened if outgassing is completed, as monitored by the two hot filaments which act as the sensors for the thermal conductivity cell system. This system detects gaseous emissions from the sample by comparing the signal from the upstream filament, which sees the dry input gas, and the signal from the downstream filament which sees the input gas plus any gaseous emissions from the sample. If any gas is being emitted from the sample, a signal imbalance results, and the signal is proportional to the gas quantity emitted from the sample.

After the thermal outgassing step, the U-tube was removed from the heater and immersed in liquid nitrogen to reduce the clay temperature to 77° K. The uptake of nitrogen by the cooled clay was monitored by the thermal conductivity cell since the clay removes nitrogen gas at a position between the upstream and downstream hot filaments. Once nitrogen uptake abated, as measured by a balanced signal from the two filaments, the U-tube was removed from the liquid nitrogen bath. After 2-3 minutes, nitrogen gas began to desorb from the sample and was detected as a peak by the downstream filament. The surface area of the clay sample was then determined by measuring the area under the desorbed nitrogen peak and then comparing to a desorption peak from a standard material of known surface area. In this case, the standard material was a reforming catalyst, Pt on alumina, with an area of 192 $m^2$/gram. The absolute surface area of the standard was determined by the BET method described by the Thomas and Thomas reference cited above.

The commercial instrumentation measurements were done using Accusorb equipment supplied by Micro-Meritics Company, instrument model No. 2100E. The Micro-Meritics instrument accommodated a sample of approximately 0.2 grams, and the sample was first outgassed at 250° C. overnight in a vacuum. The instrument has a known chamber volume, and when nitrogen gas is introduced into the chamber, pressure is measured before exposing the sample to nitrogen gas. After outgassing at 250° C. the sample is cooled to liquid nitrogen temperature and then exposed to the nitrogen gas. The volume after exposing the sample to nitrogen is the sum of the chamber volume and sample tube volume. Knowing the pressure and volume before and after gas adsorption onto the sample, the single point BET theory is utilized to deduce surface area. This technique is described in the Thomas and Thomas reference cited above for the Standard Oil method.

The micropore volume was determined by the method described by K. S. W. Sing in *Chemistry and Industry*, page 829 (1967), and is incorporated by reference as part of this specification. The micropore volume was determined by the adsorption of nitrogen gas and data analysis by the "t" plot technique, and is described by Sing.

The (001) basal plane spacings were obtained by Cu-Kα, X-ray diffractometer scans of a pressed powder specimen prepared from the clay material. The resulting positions of the diffraction pattern peaks were analyzed to determine the (001) planar spacings. This enabled a determination of the (001) planar spacings before and after the expansion of the layers and after the heat treatment step. A measurement of the (001) peak area above background was related to the volume percent of expanded versus unexpanded clay material. The thermal stability of the expanded clay was also evaluated by means of differential thermal analysis instrumentation, which measures the release or absorption of thermal energy as the material is heated or cooled.

In some of the clays the Constraint Index (C.I.) was also determined. The C.I. is a measure of the catalytic activity and is described by Frillette, Haag, and Lago in Journal of Catalysis 67, 223 (1981), which is incorporated by reference. The C.I. determination was carried out as described in this reference except an unreactive 20 percent benzene component is added to the reactive gases to act as a reference signal to account for any deviations in gas pressure during the test. C.I. tests on unexpanded Volclay 325 determined C.I.=0.9 with an n-hexane conversion of 11 percent and a 3-methylpentane conversion of 12 percent. An outside standard of reference was Nalco HA-1 which is a non-selective amorphous silica-alumina catalytic material with C.I.=0.3, with an n-hexane conversion of 14 percent and 3 methylpentane conversion of 43 percent.

EXAMPLE 1

The preparation of an expanded bentonite clay was carried out by the following procedure: 40 grams of $Cr(NO_3)_3 \cdot 9H_2O$ was added to 100 cubic centimeters of distilled water at room temperature in a one-liter beaker with constant stirring. This solution was poured rapidly into one liter of 15 N ammonia held at room temperature and contained in a four-liter beaker. This solution was then stirred constantly and aged at room temperature for approximately 24 hours and produced a clear, violet-colored fluid. Separately a slurry was prepared of the commercial bentonite clay, Volclay 325, supplied by American Colloid Company. Twenty grams of the clay was slurried at room temperature by dispersion in 1.9 liters of distilled water in a four-liter beaker. The bentonite clay was used as received without any settling or ion exchange processing steps. The previously prepared chromium-oligomer solution was poured into the clay dispersion and stirred vigorously while contacting with the oligomer solution for 23.5 hours. After this contacting step, the clay was filtered, excess chromium-oligomer solution washed out with two liters of distilled water, and the clay was reslurried with one liter of distilled water and refiltered. The filtrate was air dried at 200° C. for two hours, subjected to heat treatment in a flowing nitrogen gas atmosphere at 500° C. for one hour, and then cooled to room temperature in the nitrogen gas atmosphere. The product clay material had a surface area of 165 $m^2/g$ as measured by Accusorb instrumentation, a micropore volume of 0.03 cc/g, a (001) planar spacing of 12.1 angstroms, and approximately 100 percent expansion of the available clay material.

EXAMPLE 2

The product bentonite clay from Example 1 was further treated by heating to 300° C. in air for two hours. The resulting product clay had two (001) planar spacings, 12.1 angstroms and 9.9 angstroms. The clay which remained in the expanded state was approximately 90 percent and only 10 percent had collapsed to the unexpanded state. The product clay had a surface area of 136 $m^2/g$ as compared with 165 $m^2/g$ after the 500° C. nitrogen treatment.

EXAMPLE 3

A separate portion of the expanded bentonite clay product in Example 1 was subjected to a heat treatment after reaction with the oligomer solution which consisted solely of air drying at 200° C. for two hours. This clay had a (001) planar spacing of 13.6 angstroms and a surface area of 179 $m^2/g$ as determined by Accusorb instrumentation measurements.

EXAMPLE 4

The product bentonite clay from Example 3 was subjected to an additional heat treatment step consisting of annealing at 500° C. in air for two hours. The resulting product clay had a (001) planar spacing of 9.5 angstroms (the same as the (001) spacing in unexpanded clay) and a surface area of 55 $m^2/g$ as determined by Accusorb instrumentation measurements.

EXAMPLE 5

An expanded bentonite clay was produced using the same process steps as Example 1 except the chromium-oligomer solution was prepared by dissolving 40 grams of chromium nitrate in one liter of water, and a solution of 7.3 grams of sodium hydroxide in one liter of water was added drop wise over a 1½ hour period to the chromium-nitrate solution held at room temperature and stirred. The oligomer solution was aged for 12 days at room temperature, producing a clear, green-colored fluid. The resulting product clay had a surface area of 153 $m^2/g$ determined by Accusorb instrumentation, a micropore volume of 0.05 cc/g, and two sets of (001) planar spacings, 13.4 angstroms and 9.6 angstroms. The percentage of clay having an expanded (001) planar spacing of 13.4 angstroms was 70 percent, and the balance of the clay had an unexpanded (001) planar spacing of 9.6 angstroms.

The Example 5 clay product discussed above was prepared in a manner quite similar to the preparation of the Brindley and Yamanaka reference, but the process and resulting product clay do have significant differences from the instant invention. The main differences in the preferred form of the invention include: (a) an additional step of heat treatment in an inert gas atmosphere which stabilizes the expanded clay and (b) the use of concentrated $NH_3$ in the preferred process of the instant invention, rather than NaOH, as the hydroxyl-ion source for the chromium oligomer.

The heat treatment step is essential to produce interlayer "pillars" which are chemically and structurally stable in air above 200° C. If exposed to a temperature of approximately 300° C. or higher in air for two hours, the unstabilized Brindley-type expanded clay tends to collapse to the unexpanded state (Brindley and Yamanaka, page 832) with a (001) planar spacing of 10.4 angstroms. However, after the additional inert gas heat treatment step of Example 1, and further calcination in air at 300° C. for two hours, the resulting chromium expanded clay shows virtually no change in the expanded (001) planar spacing.

Furthermore the use of NH₃ rather than NaOH resulted in an end product, expanded clay with approximately 90 to 100 percent of the available clay layers having undergone expansion. However, if NaOH were used, typically only about 70 percent of the available clay layers were successfully expanded, even though much longer aging times were used. In addition, the time necessary to complete preparation of the chromium oligomers using NH₃ was accelerated by factors of at least 10, and the time necessary to carry out expansion of the clay was reduced by factors of 10 to 100 as compared to the reaction times in the process performed by Brindley and Yamanaka.

EXAMPLE 6

The product bentonite clay from Example 5 was subjected to further heating at 300° C. in air for two hours. The resulting product clay had two (001) planar spacings, 13.0 and 9.8 angstroms. Approximately 60–70 percent of the crystalline clay was in the expanded state with a 13.0 angstrom spacing. This percentage breakdown was the same as after the 500° C. nitrogen gas treatment and before this 300° C. air treatment. The surface area, measured by the Accusorb instrumentation, decreased slightly from 153 to 136 $m^2/g$.

EXAMPLE 7

A separate portion of the expanded bentonite clay produced in Example 5 was subjected to heat treatment after clay expansion and consisted solely of heating in air at 200° C. for two hours. The product clay had two prominent (001) planar spacings, 14.1 angstroms and 8.0 angstroms with approximately 60–70 percent of the crystalline clay in the expanded state, and the rest unexpanded. The surface area was 184 $m^2/g$ as determined by Accusorb instrumentation measurements.

EXAMPLE 8

The product bentonite clay from Example 7 was subjected to an additional heat treatment at 500° C. in air for two hours. The (001) planar spacing was reduced to 9.4 angstroms, and a surface area of 44 $m^2/g$ was measured by Accusorb instrumentation.

EXAMPLE 9

An expanded bentonite clay was prepared by dissolving 7.2 grams of chromium nitrate in 0.1 liters of water. This solution was added to one liter of 15 N ammonia and stirred for five minutes at room temperature to produce the chromium-oligomer solution. The oligomer solution was added to a room temperature suspension of clay in water which was previously prepared by combining 10 grams of Volclay 325 with 1.9 liters of water. This solution was stirred continuously for 24 hours, the expanded clay was then filtered from the solution, washed with two liters of distilled water, and subjected to heat treatment at 200° C. in air for two hours. The resulting product clay had two distinct (001) planar spacings of 12.5 angstroms and 9.9 angstroms. Approximately 84 percent of the clay was in the expanded state 12.5 angstrom (001) planar spacing. The surface area was 79 $m^2/g$ as measured by the Standard Oil Company method.

EXAMPLE 10

An expanded bentonite clay was prepared by dissolving 43.2 grams of chromium nitrate in 0.2 liters of distilled water at room temperature with constant stirring. This solution was added to one liter of 15 N ammonia and aged for four hours at room temperature while stirring. The suspension of clay was prepared by adding 20 grams of Volclay 325 to two liters of distilled water, and the chromium-oligomer solution was added to the clay suspension and stirred for three days at room temperature. The expanded clay was filtered, washed with two liters of water, and calcined for two hours at 200° C. in air. The product clay had a (001) planar spacing of 14.5 angstroms and a surface area of 135 $m^2/g$ as measured by the Standard Oil Method. Differential Thermal Analysis (DTA) was performed from room temperature to 500° C. in air on a sample of this product clay, and a large exotherm occurred near 265° C. Subsequent X-ray measurements indicated a collapse of the clay to the unexpanded state. A separate portion of the product clay was calcined in air at 500° C. for 2 hours and the surface area was reduced to 57 $m^2$/gram.

Another sample of this product clay was subjected to DTA heating at 10 C.°/minute to 540° C. in nitrogen and then in air from room temperature to 500° C. at 10 C.°/minute. The DTA run in nitrogen to 540° C. showed only a small exotherm, and the rerun in air to 500° C. showed no detectible exotherm. The product clay had (001) planar spacings of 13.0 angstroms and 10.8 angstroms with about 50 percent crystallinity maintained and a substantial portion of this in the expanded clay state.

EXAMPLE 11

An expanded bentonite clay was prepared by dissolving 43.2 grams of chromium nitrate in 0.1 liters of distilled water held at room temperature and stirred. This solution was added to one liter of 15 N ammonia and was aged for 2.5 hours at room temperature, stirring continuously. This aged chromium solution was added to a suspension of 20 grams of Volclay 325 in two liters of water and stirred for two hours while at room temperature. The expanded clay was filtered, washed with two liters of distilled water, and the filtrate calcined at 200° C. in air for two hours. The product clay had (001) planar spacings of 14.1 angstroms and 10.1 angstroms with about 90 percent of the clay in the expanded state. The clay had a surface area of 117 $m^2/g$ as measured by the Accusorb instrumentation.

EXAMPLE 12

A portion of the expanded bentonite clay from Example 11 was subjected to an additional heat treatment in air at 350° C. for 2 hours. The resulting clay had (001) planar spacings of 14.5 angstroms and 10.0 angstroms with about 50 percent of the crystalline clay in the expanded state. The surface area was 34 $m^2$/gram as measured by the Accusorb instrumentation.

EXAMPLE 13

A portion of the expanded bentonite clay from Example 11 was subjected to an additional heat treatment at 500° C. in nitrogen gas for one hour. The resulting clay had an expanded (001) planar spacing of 12.1 angstroms. A surface area of 131 $m^2/g$ was measured by the Accusorb instrumentation.

EXAMPLE 14

An expanded bentonite clay was prepared by dissolving 108 grams of chromium nitrate in 0.5 liters of distilled water held at room temperature and stirred. This solution was added to one liter of 15 N ammonia, and was aged for two minutes at room temperature, stirring continuously. This aged chromium solution was added to a suspension of 10 grams of Volclay 325 in two liters of distilled water, and the mixture was stirred for three days at room temperature. The clay was filtered, washed with two liters of water, and the filtrate calcined at 200° C. in air for two hours. The product clay had a surface area of 305 m$^2$/g as measured by the Standard Oil Company method. The product clay appeared to be completely amorphous in structure as determined by X-ray diffraction.

EXAMPLE 15

A portion of the expanded bentonite clay from Example 14 was subjected to an additional step of heating in air at 500° C. for two hours. The resulting product clay had a surface area of 91 m$^2$/g as measured by the Standard Oil method. The clay had (001) planar spacings of 12.3 Angstroms and 10.3 Angstroms with approximately equal intensity for these two crystalline peaks and a large portion of the clay in the amorphous state.

EXAMPLE 16

An expanded bentonite clay was prepared by dissolving 8 grams of chromium nitrate in 0.1 liters of distilled water held at room temperature and stirred. This solution was added to one liter of 15 N ammonia, and was aged for 15 minutes at room temperature, stirring continuously. This aged solution was added dropwise over 45 minutes to a suspension of 10 grams Volclay 325 in 2 liters of distilled water, and the mixture was stirred for 65 hours at room temperature. The expanded clay was filtered, washed with two liters of distilled water, the filtrate calcined at 110° C. in air overnight, and calcined at 500° C. for 2 hours. The product clay had a surface area of 72 m$^2$/gram as measured by the Standard Oil method. The (001) crystalline planar spacings were 15.4 angstroms and 10.2 angstroms with approximately one third of the clay having the expanded 15.4 angstrom spacing. A Constraint Index of 1.0 was measured with an n-hexane conversion of 30 percent and a 3-methylpentane conversion of 32 percent.

We claim:

1. A process for the preparation of a stabilized, porous expanded layer, smectite clays comprising:
    (a) contacting an aqueous slurry of smectite clay with an aged chromium-oligomer solution,
    (b) separating a product clay from the mixture of step (a),
    (c) drying said product clay, and
    (d) stabilizing said product clay by an inert gas atmosphere heat treatment including a temperature above about 200° C. to effect the production of a stabilized clay, which when contacted with air at a temperature above 300° C. for at least two hours a majority of said clay is maintained in an expanded state.

2. The process of claim 1 wherein said inert gas atmosphere is nitrogen.

3. The process of claim 1 wherein said chromium-oligomer solution is prepared by reacting a chromium-salt solution with a hydroxyl ion source.

4. The process of claim 3 wherein said hydroxylion source is concentrated ammonia.

5. The process of claim 3 or 4 wherein said chromium salt is chromium nitrate.

6. The process of claim 5 wherein said chromium-oligomer solution is aged at least 2 minutes at room temperature.

7. The process of claim 5 wherein said chromium-oligomer solution has a preferred concentration of 6 to 72 grams chromium nitrate per liter of said oligomer solution.

8. A process for the preparation of a stabilized, porous expanded layer, bentonite clay comprising:
    (a) contacting an aqueous slurry of bentonite clay with an aged chromium-oligomer solution prepared by reacting chromium nitrate with concentrated ammonia,
    (b) separating a product bentonite clay from step (a),
    (c) drying said product bentonite clay and
    (d) stabilizing said product by an inert gas atmosphere heat treatment at a temperature above about 200° C. to effect the production of a stabilized clay, which when contacted with air at a temperature above 300° C. for at least two hours a majority of said clay is maintained in an expanded state.

9. The process of claim 8 further including stabilizing said product bentonite clay by heating to at least 500° C. in a nitrogen-gas atmosphere.

10. A porous catalytic material comprising, a smectite clay having expanded molecular layers, a multiplicity of chromium-base "pillars" interposed between the molecular layers of said smectite clay, said chromium-base "pillars" maintaining the spacing of said expanded molecular layers at a temperature of at least 300° C. in an air atmosphere for 2 hours wherein said material having been produced by a process comprising:
    (a) contacting an aqueous slurry of smectite clay with an aged chromium-oligomer solution,
    (b) separating a product clay from the mixture of step (a),
    (c) drying product clay, and
    (d) stabilizing product clay by an inert gas atmosphere heat treatment including a temperature above about 200° C.

11. The porous catalytic material of claim 10 wherein said smectite clay is bentonite clay.

12. The porous catalytic material of claim 11 wherein the (001) planes of said expanded molecular layers are spaced apart less than 15.4 angstroms.

13. The porous catalytic material of claim 12 wherein the surface area is between 44 and 305 m$^2$/gram.

* * * * *